United States Patent [19]

Hemminger et al.

[11] Patent Number: 4,587,939

[45] Date of Patent: May 13, 1986

[54] SAFETY DEVICE FOR A MICROCOMPUTER CONTROLLED INTERNAL COMBUSTION

[75] Inventors: Herman Hemminger, Möglingen; Werner Jundt, Ludwigsburg; Sybille Weller, Oberriexingen; Peter Werner, Wiernsheim, all of Fed. Rep. of Germany

[73] Assignee: Robert Bosch GmbH, Stuttgart, Fed. Rep. of Germany

[21] Appl. No.: 664,889

[22] Filed: Oct. 25, 1984

[30] Foreign Application Priority Data

Nov. 26, 1983 [DE] Fed. Rep. of Germany ....... 3342848

[51] Int. Cl.[4] ........................ F02M 51/00; H02H 3/24

[52] U.S. Cl. ................................ 123/479; 364/431.11

[58] Field of Search ............... 123/416, 417, 479, 630; 364/431.11

[56] References Cited

U.S. PATENT DOCUMENTS 4,255,789 3/1981 Hartford et al. ................ 123/417 X 4,503,479 3/1985 Otsuka et al. .............. 364/431.11 X 4,531,190 7/1985 Drews et al. .................. 123/479 X

FOREIGN PATENT DOCUMENTS 13238 1/1982 Japan .................................. 123/479

*Primary Examiner*—Tony M. Argenbright

*Attorney, Agent, or Firm*—Michael J. Striker

[57] ABSTRACT

A safety device for a controlling unit of an internal combustion engine controlled by a microcomputer includes the following circuits: (a) a source of stabilized voltage which may be subject to fluctuations; (b) a first monitoring circuit responsive to voltage breaks in the voltage source to block the controlling unit for the duration of respective voltage breaks; (c) a second monitoring circuit responsive to the operability of the microcomputer to block the controlling unit for the duration of the resetting time of the microcomputer when a non-operative condition of the microcomputer is detected.

6 Claims, 3 Drawing Figures a)

b)

SAFETY DEVICE FOR A MICROCOMPUTER CONTROLLED INTERNAL COMBUSTION

BACKGROUND OF THE INVENTION

The present invention relates to a protective device for a controlling member of an internal combustion engine which is controlled or regulated by a microcomputer and having an internal power source for the microcomputer and an electronically controlled fuel injection system.

With increased application of microelectronics for controlling and regulating purposes in internal combustion engines, continuous improvements with regards the operational behavior of the internal combustion engine are achieved. For example, such improvements considerably reduce the fuel consumption and also the exhaust gas emission, and in the case of sudden load changes of the engine the microcomputer control insures a smooth transition behavior. Also, additional functions such as warm-up fuel enrichment, overrun cutoff and the like can be realized by the microelectronics devices in a very simple manner.

As a rule, such electronic controlling components operate reliably and without interference. Nevertheless, particularly in controlling the internal combustion engines in motor vehicles, a problem of a reliable power supply for the electronic modules frequently occurs. In contrast to conditions in a laboratory, in motor vehicles under circumstances considerable fluctuations of the power supply voltage, namely of the battery voltage, are unavoidable. In order to eliminate the effects of such battery voltage fluctuations, there has been already developed large number of stabilizing circuits for example. However, in the case of very strong dips or breaks in the battery voltage, occurring for example during starting of the engine at low temperatures, the stabilizing circuits become incapable of delivering the requisite supply voltage to the electronic modules. In this case, in order to prevent any uncontrolled activation of the setting member of the fuel injection system, which the end stage of the fuel injection might lead to flooding the cylinders of the engine with fuel, voltage monitors have been devised for detecting drops of the stabilized voltage.

For this purpose voltage regulators with a built-in voltage monitor are frequently used, for example the voltage regulator LM2935 of National Semiconductor, whose output of the voltage monitor is directly connected to the reset input of the controlling microcomputer. In the event of a drop of the power supply voltage below a predetermined level, the microcomputer is momentarily set out of operation and the setting member of the fuel injection is brought to a predetermined position. As a consequence, for a considerable time period (reset duration of about 100 milliseconds), no fuel injection is possible. This interruption is independent on the time interval during which the stabilized voltage drops below the predetermined level of the voltage monitor.

In general, however, a microcomputer can operate at substantially lower operating voltages than those determined by the threshold level voltage of the voltage monitor.

The disadvantage of such prior art voltage regulators with voltage monitors is the fact that the controlling microcomputer during a large number of repetitive voltage breaks in the stabilized power supply is repeatedly reset and restarted even if the computer by itself is still operative. Inasmuch as the restarting of a computer requires a certain time interval (reset interval of about 10 to 200 milliseconds), the controlled setting member of the fuel injection is frequently blocked for unnecessarily long time periods. When this happens in the end stage of the fuel injection, no fuel is injected in the cylinders at all.

SUMMARY OF THE INVENTION

It is therefore a general object of the present invention to overcome the aforementioned disadvantages.

More particularly, it is an object of the invention to provide an improved safety device of the above described type in which a setting member controlled by the microcomputer is no longer kept inoperative for an unnecessarily long time periods when breaks in the power supply voltage occur and the function of the controlling microcomputer is maintained as long as possible.

An additional object of the invention is to prevent floading by fuel of cylinders of the engine even if peripheral devices of the microcomputer became inoperative, especially during short breaks in the power supply voltage occurring for example during the starting phase.

A further object of this invention is to eliminate the effect of the momentary blocking of the end stage of the fuel injection system on the fuel injection so that the injection interval coincides with the crests of the fluctuating battery voltage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
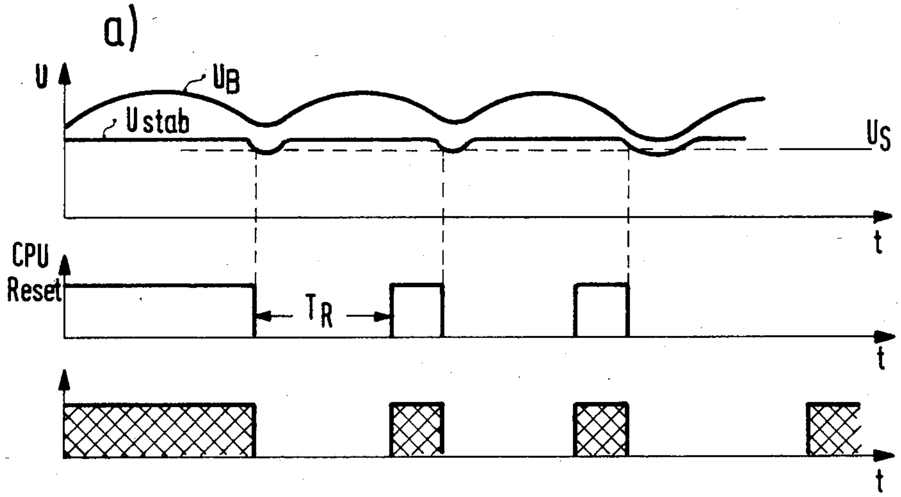
FIG. 1A illustrates time plots of battery voltage, stabilized voltage, resetting time intervals of a computer, and corresponding time intervals of inoperability of a controlled setting or regulating member in the engine.
FIG. 1B shows time plots of signals in the device of this invention.
Figure 1:
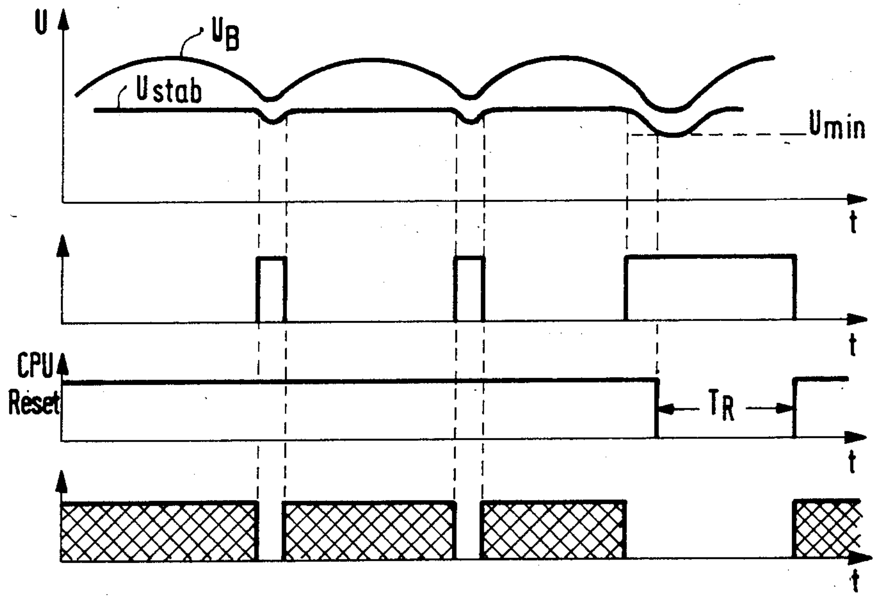

Referring firstly to FIG. 1A, the illustrated time plots of a fluctuating battery voltage, of interrupted stabilized voltage and the resulting resetting periods of a controlling microcomputer and corresponding breaks in the operability of a setting unit controlled by the microcomputer, serve for illustrating the problems encountered in prior art safety devices of this kind. A power supply or battery voltage $U_B$ exhibits fluctuations caused for example during the starting of the engine. It is assumed that a voltage stabilizer, when the power supply voltage $U_B$ drops below a preset minimum value $U_S$, becomes inoperative so that small breaks in the stabilized voltage $U_{stab}$ will occur. If during the fluctuations of the level of the stabilized voltage $U_{stab}$ the voltage drops below threshold level $U_s$ as is the case in all instances of the illustrated interruptions, then a voltage monitor resets and restarts the microcomputer. The new start of the operation of the microcomputer takes certain time period $T_R$ during which as shown in the lowermost plot in FIG. 1A a setting member in the engine is rendered inoperative or locked. In the case of longer reset times $T_R$ or for more frequent fluctuations of the battery voltage it may happen that the setting member to be controlled is permanently locked. For example if the setting member is the end stage of a fuel injection system, no fuel is supplied into the cylinders of the engine and starting of the latter is made impossible.

FIG. 1B illustrates by way of similar time plots the operation of the device according to this invention. The first time plot of the battery voltage $U_B$ and of stabilized voltage $U_{stab}$ corresponds to that of FIG. 1A with the difference that during the third break in the stabilized voltage the latter falls below a level $U_{min}$ which represents the limit under which the microcomputer becomes inoperative and a restart or reset of the microcomputer is necessary, requiring a reset time interval $T_R$ for the restoration of this operation. So far the operation of the device of this invention corresponds to that of prior art devices with the exception that in the first two breaks of the stabilized voltage during which the voltage drop is still above the threshold value $U_{min}$ necessary for the operation of the computer, the injection stage is locked only for the relatively short duration of the break of the stabilized power supply. This is illustrated in the fourth plot in FIG. 1B resulting from OR logic relationship between the duration of the locking of the end stage of the injection system (shown in the second plot) and the reset time interval $T_R$ shown in the third diagram. The cross-hatched time intervals in the fourth diagram indicate the operativeness of the end stage of the injection system. It is evident that due to the fact that the reset or restart of the microcomputer does not take place in response to each drop of the stabilized voltage below a threshold level $U_s$ set by the voltage stabilizer but occurs only after falling below a lower threshold value $U_{min}$ substantially longer periods of operativeness of the fuel injection system are achieved.

Figure 2:
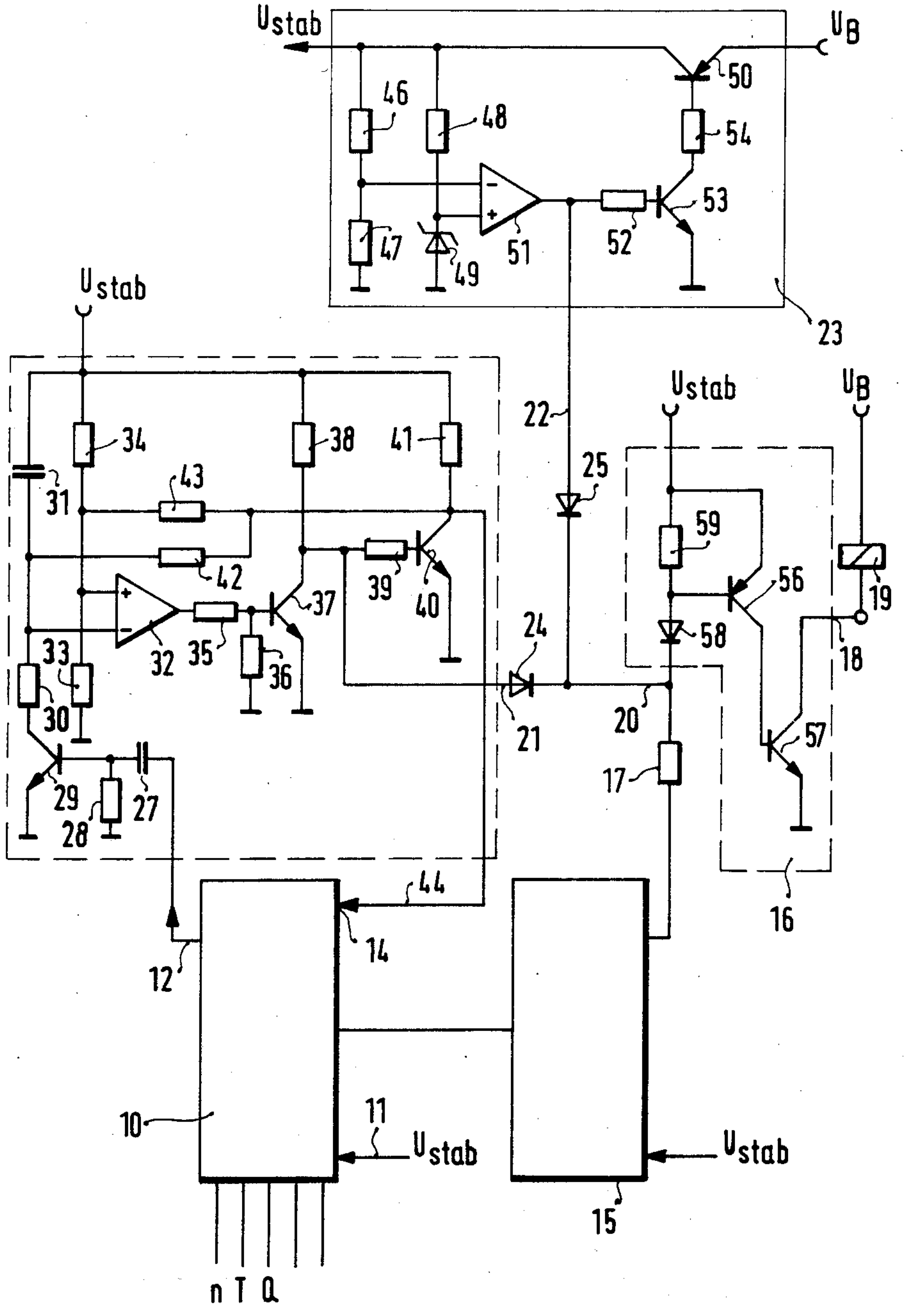
FIG. 2 is a circuit diagram of an exemplary embodiment of the device of this invention.

An exemplary embodiment of the safety device of this invention is illustrated in FIG. 2. Reference numeral 10 denotes a microcomputer having a plurality of inputs n, T, O and the like to which signals corresponding to different variables or operational parameters of the engine, such as rotary speed n, temperature T, air flow volume Q and the like, are applied. A terminal 11 of the microcomputer 10 receives stabilized power supply voltage $U_{stab}$. An output terminal 12 of the microcomputer is connected to a monitoring circuit 13, while the output of the monitoring circuit is connected to a restart or reset input terminal 14. The microcomputer 10 also activates a timing member 15 whose output is connected via resistor 17 to fuel injection end stage 16. The output 18 of the fuel injection end stage is connected via one or more fuel injection valves 19 to the battery voltage $U_b$. A connection point 20 between the resistor 17 and the fuel injection end stage 16 is connected via diodes 24 and 25 to a conduit 21 from the voltage monitor 13 and to a conduit 22 from the voltage stabilizer 23.

The timing member 15, the voltage monitor 13 and fuel injection end stage 16 are supplied with stabilized voltage $U_{stab}$ delivered from the output of the voltage stabilizer 23.

The cooperation of respective circuit blocks 13, 16 and 23 in the device of this invention is as follows: if a constant stabilized voltage is present at the output of the stabilizer 23, that means if there are no fluctuations of the battery voltage $U_b$, then potential at conduits 22 and 21 has a value close to zero. Inasmuch as the output signals from the timing member 15 have amplitudes between the mass potential and that of the stabilized voltage $U_{stab}$, the diodes 24 and 25 during this no-interference condition are blocked and the fuel injection valve or valves 19 are operative.

If, however, the stabilized voltage $U_{stab}$ falls below its nominal value, potential at the conduit 22 takes up positive values. The diode 25 during the time interval of the drop of the stabilized voltage below the nominal value $U_s$ becomes conductive. As a consequence, the fuel injection at stage 16 is blocked and metering of the fuel is reduced to zero. Immediately upon the restoration of the stabilized power supply voltage to its nominal value, potential at the conduit 22 drops again to low values and diode 25 is blocked. This measure serves for preventing the timing member 15 from delivering an undue or erroneous fuel injection time point due to the break in the stabilized power supply voltage $U_{stab}$.

In contrast, the high potential is present at the conduit 21 only in the case when voltage monitoring circuit 13 detects via conduit 12 an inoperativeness of the microcomputer 10. In the latter case, the diode 24 remains conductive for the resetting period $T_R$ of the microcomputer even if the stabilized power supply voltage has reached its nominal value.

In this manner the fuel injection end stage 16 is not blocked by superfluous resettings of the microcomputer 10.

The voltage monitoring circuit 13 is designed as follows: the monitoring output 12 of the microcomputer 10 is connected via a high pass filter consisting of a capacitor 27 and a resistor 28 to the base of a transistor 29 whose emitter is connected to mass potential. Collector of the transistor is connected via a resistor 30 and a capacitor 31 to the stabilized voltage $U_{stab}$. An operational amplifier 32 has its inverting input connected to the connection point between the capacitor 31 and the resistor 30. The non-inverting input of the operational amplifier 32 is connected to the stabilized voltage via a voltage divider 33 of resistors 33 and 34. The output of the operational amplifier 32 is connected via another voltage divider consisting of resistors 35 and 36 to the base of a transistor 37. The emitter of transistor 37 is at a mass potential whereas its collector is connected via resistor 38 to the stabilized voltage $U_{stab}$ and further via the aforementioned conduit 21 to the diode 24. The collector of transistor 37 is also connected via resistor 39 to the base of a further transistor 40 whose emitter is again at a mass potential. The collector of the transistor 40 is connected via resistor 41 to the source of the stabilized voltage $U_{stab}$, via a resistor 42 to the inverting input and via a resistor 43 to the non-inverting input of the operational amplifier 32 and is also connected through the conduit 44 to the input 14 of the microprocessor 10.

The voltage stabilizing circuit 24 is of a conventional design, consisting of a bridge whose two branches consisting respectively of resistors 46 and 47 and resistors 48 and a zener diode 49 are connected between the collector of a transistor 50 and mass potential. The connection point between the resistors 46 and 47 is connected to the inverting input of an operational amplifier 51 and the connection point between resistor 48 and the zener diode 49 is connected to the non-inverting input of the latter amplifier. The output of the operational amplifier 51 is connected via the beforementioned conduit 22 to the diode 25 and via a resistor 52 to a base of a transistor 53 whose emitter is also at a mass potential. The collector of transistor 53 is connected via a resistor 54 to the base of a transistor 50 whose emitter is at a potential of the battery voltage $U_b$. The stabilized power supply voltage $U_{stab}$ is delivered from the collector of the transistor 50.

The fuel injection end stage 16 is also of a known design, consisting of two transistors 56 and 57 whereby the emitter of transistor 56 is connected to the source of stabilized voltage $U_{stab}$ and its collector is connected to the base of a further transistor 57, the emitter of the latter transistor being at mass potential. The collector of transistor 57 is connected via one or more fuel injection valves 19 to the source of battery voltage $U_b$. The fuel injection end stage 16 is controlled by signals from the connection point, applied to the base of transistor 56 via a diode 58. The base of transistor 56 is further connected resistor 59 to the source of stabilized voltage. The operation of this fuel injection end stage is generally known and need not be explained in detail for the purposes of this invention.

The operational amplifier 51 in the voltage stabilizer 23 works in such a way as to control the series transistor 50 in response to the momentary value of the battery voltage in order to balance the bridge 46 through 49 at its inputs. If the battery voltage drops to a low value at which the stabilization can no longer be maintained, then the output signal from the operational amplifier 51 reaches its upper final value at which the diode 25 becomes conductive and causes the blocking of the fuel injection end stage 16.

The monitoring circuit 13 is controlled by a signal from the monitoring terminal 12 of the microcomputer in such a way that when the computer 10 is operative, the transistor 29 is continuously controlled on and off. When the transistor 29 is on, capacitor 31 is charged via the register 30. The capacitor 31 can discharge through resistors 41 and 42 provided that transistor 40 is switched off. The values of resistor 30, capacitor 31, resistors 41 and 42 are set such that for an operative microcomputer 10 the potential at the inverting input is always below the potential at the non-inverting input of the operational amplifier 32. If the stabilized power supply voltage $U_{stab}$ drops to a value at which the microcomputer is no longer operative then at the monitoring terminal 12 of the microcomputer a direct current potential is present and transistor 29 is switched off. Capacitor 31 keeps discharging until voltage at the inverting input exceeds the voltage at the non-inverting input of the operational amplifier 32, causing the latter to switch on, thus closing the transistor 37. Consequently, conduit 21 is brought to a high potential and the fuel injection end stage is blocked. The transistor 40 becomes conductive and loads via resistor 42 the capacitor 31 until the operational amplifier 32 changes its output state. The time interval between the changeovers of the states is selected according to the reset duration $T_R$ of the microprocessor.

By the action of the monitoring circuit 13 it is guaranteed that the fuel injection end stage is actually blocked only after the microcomputer 10 is rendered inoperative and only for the duration $T_R$ of the resetting process. For breaks in the stabilized voltage which do not lead to an inoperability of the microcomputers 10, the fuel injection stage 16 is blocked via conduit 22 only for the duration of this voltage break in order to prevent interference due to an incorrect output of the fuel injection time from the timing member 15.

As seen from the lowermost diagram in FIG. 1B, the time intervals during which the fuel injection end stage is operative coincide with the crests of the fluctuations of the battery voltage $U_b$ at which the microcomputer is still operative and consequently the momentary blocking of the end stage of the fuel injection system does not affect the operability of the fuel injection system.

It will be understood that each of the elements described above, or two or more together, may also find a useful application in other types of constructions differing from the types described above. For example, the specific controlling arrangement for the fuel injection end stage by means of a timing member 15 and the microcomputer 10 can be modified in such a way that the timing member is an integral part of the microcomputer or the fuel injection end stage 16 can be controlled by digital signals via a digital/analog converter.

While the invention has been illustrated and described as embodied in a specific example for use in safeguarding a fuel injection system of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A safety device for a controlling unit of a fuel injection system of an internal combustion engine controlled or regulated by a micro-computer, comprising a voltage source for the microcomputer and its peripheral devices; a first monitoring means responsive to voltage breaks in said voltage source to produce a first signal applied to said controlling unit for adjusting the same to a safety position while the microcomputer remains operative; and a second monitoring means responsive to the operability of the microcomputer to produce a second signal applied to said controlling unit for adjusting the same to said safety position when a non-operative condition of the microcomputer caused by voltage fluctuations is detected.

2. A safety device as defined in claim 1, wherein said controlling unit is an end stage of a fuel injection system of the engine.

3. A safety device as defined in claim 2, wherein said first monitoring means adjusts the safety position of the controlling unit for the duration of respective voltage breaks.

4. A safety device as defined in claim 3, wherein the second monitoring means, after dropping of the source voltage below a level at which the microcomputer becomes inoperative, adjusts the safety position of the controlling unit for a predetermined time interval.

5. A safety device as defined in claim 4, wherein the first and second signals from respective monitoring means control the safety position of the controlling unit via an OR logic.

6. A safety device as defined in claim 4, wherein the microcomputer has a voltage monitoring terminal connected to the second monitoring means, and a reset input connected to the second monitoring means for receiving said second signal.

* * * * *